No. 757,923. PATENTED APR. 19, 1904.
A. C. HILLS.
VEHICLE TIRE.
APPLICATION FILED AUG. 3, 1903.
NO MODEL.
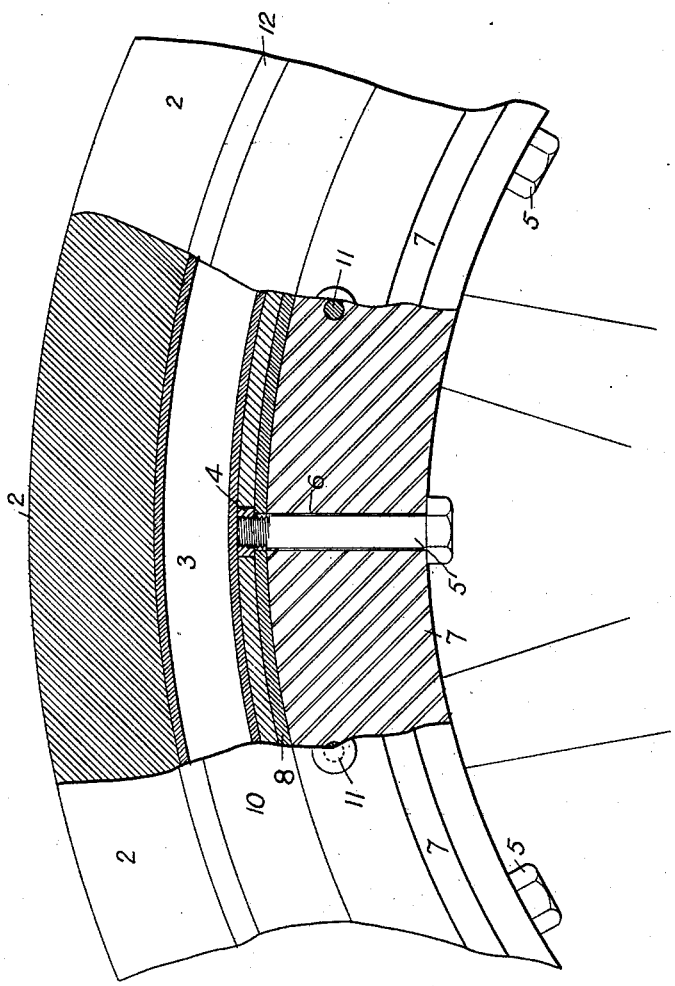
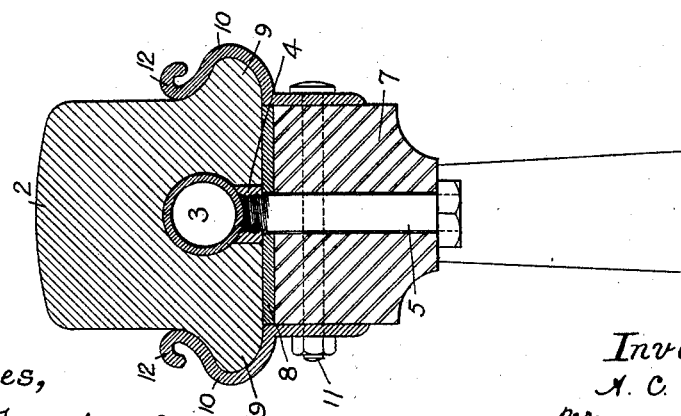
Witnesses,
John T Fazakarley
F. H. Edmunds.
Inventor,
A. C. Hills,
per.
Douglas Leechman
Attorney.

No. 757,923. Patented April 19, 1904.

UNITED STATES PATENT OFFICE.

ALBERT C. HILLS, OF LONDON, ENGLAND.

VEHICLE-TIRE.

SPECIFICATION forming part of Letters Patent No. 757,923, dated April 19, 1904.

Application filed August 3, 1903. Serial No. 168,051. (No model.)

*To all whom it may concern:*

Be it known that I, ALBERT CHARLES HILLS, a subject of the King of Great Britain, residing at London, England, have invented certain Improvements in Vehicle-Tires, of which the following is a specification.

My invention relates to vehicle-tires, and has for its object to securely attach a tire of india-rubber or the like to a vehicle-wheel in such a way that it cannot leave the wheel accidentally or creep relatively to the said wheel or be liable to splitting or cracking due to the means of attachment.

In the accompanying drawings, Figure 1 is a transverse section; and Fig. 2 is a side elevation, partly in section, of a vehicle-tire constructed according to my invention.

The same numerals refer to the same parts in both views.

The rubber tire 2 itself is preferably constructed endless and is molded about a tubular hoop 3, which is thus entirely embedded therein. On the under side of the hoop 3 are provided a series of equidistant sockets 4. These sockets may be made from tube and are screw-threaded internally to receive the screw-threaded ends of bolts 5, which are passed through holes 6 in the fellies 7 and the rim 8. The sockets 4 may be arranged at three inches apart or at other suitable intervals. Being rigid in themselves, they prevent the hoop 3 being distorted and the rubber between the said hoop and the rim 8 being unduly compressed by the tightening of the bolts 5.

The base of the tire 2 is formed with lateral projections 9 9, adapted to enter correspondingly-recessed flanges 10, which are secured to the wheel, as by the bolts 11, passing through both the fellies 7 and the flanges 10, so that one, at least, of the said flanges is detachable. The edges 12 of the flanges 10 are rounded off to prevent cutting. The broad-based rubber tire 2 is thus secured to the wheel by the flanges 10, the incompressibility, strength, and rigidity of the hoop 3 rendering the parting of the tire from the wheel extremely improbable, and this is accomplished without the fixing presenting any sharp edges to the rubber or putting any irregular strains thereon. The rubber tire is further anchored to the wheel by the bolts 5 engaging the sockets 4 on the hoop 3, and the creeping of the rubber tire around the wheel is entirely prevented thereby.

To detach the tire, one of the flanges 10 is removed and all the bolts 5 are withdrawn from the sockets 4, when the tire may be slipped off the wheel sidewise. In attaching and replacing the tire care must be taken to arrange the sockets 4 correctly over the holes 6 in the fellies and rim.

What I claim as my invention, and desire to secure by Letters Patent, is—

1. In combination, an elastic tire, a hoop embedded in said tire, sockets on said hoop projecting through the base of the tire, adapted to bear against the felly of the wheel to relieve the tire from pressure, holes in the felly registering with the sockets on the hoop, fastening-bolts inserted through the holes in the felly, means for engaging the bolts with the sockets on the hoop, means for engaging the bolts with the felly, and flanges on the sides of the felly to prevent the tire from lateral displacement, substantially as and for the purpose set forth.

2. In combination, an elastic tire, a tubular hoop embedded in said tire, sockets on said hoop projecting through the base of the tire and adapted to bear against the felly of the wheel to relieve the tire from pressure, holes in the felly registering with the sockets on the hoop, fastening-bolts inserted through the holes in the felly, means for engaging the bolts with the sockets on the hoop, means for engaging the bolts with the felly, and flanges on the sides of the felly to prevent the tire from lateral displacement, substantially as and for the purpose set forth.

3. In combination, an elastic tire, a hoop embedded in said tire, screw-threaded sockets on said hoop projecting through the base of the tire and adapted to bear against the felly of the wheel to relieve the tire from pressure, holes in the felly registering with the sockets on the hoop, fastening-bolts inserted through the holes in the felly and screw-threaded to engage the sockets on the hoop, means for engaging the bolts with the felly and flanges on the sides of the felly to prevent the tire from lateral displacement, substantially as and for the purpose set forth.

4. In combination, an elastic tire, a hoop embedded in said tire, sockets on said hoop projecting through the base of the tire and adapted to bear against the felly of the wheel to relieve the tire from pressure, holes in the felly registering with the sockets on the hoop, fastening-bolts inserted through the holes in the felly, means for engaging the bolts with the sockets on the hoop, means for engaging the bolts with the felly, lateral projections on base of tire, side flanges on the felly of the wheel having lateral recesses to receive the projections of the tire, and means for securing one of the flanges detachably, substantially as and for the purpose described.

In testimony whereof I have signed my name to this specification in the presence of two subscribing witnesses.

A. C. HILLS.

Witnesses:
WILLIAM T. COOKE,
R. H. BEAUCHAMP.